United States Patent [19]
Russell et al.

[11] Patent Number: 5,780,408
[45] Date of Patent: *Jul. 14, 1998

[54] BODY MOULDING SOLUTION

[75] Inventors: Mark John Russell; Michael John Rickhuss, both of Mackay; Zygmunt Joseph Zielinski, Seaforth, all of Australia

[73] Assignee: MMZ Solutions Pty. Ltd., Queensland, Australia

[*] Notice: The term of this patent shall not extend beyond the expiration date of Pat. No. 5,376,299.

[21] Appl. No.: 652,125

[22] Filed: May 23, 1996

(Under 37 CFR 1.47)

Related U.S. Application Data

[63] Continuation of Ser. No. 327,921, Oct. 24, 1994, abandoned, which is a continuation-in-part of Ser. No. 85,881, Jun. 30, 1993, Pat. No. 5,376,299.

[51] Int. Cl.⁶ .............................. C11D 7/50; C11D 7/24; C11D 7/60
[52] U.S. Cl. .............................. 510/200; 134/38; 134/39; 510/407
[58] Field of Search ................ 134/38, 40; 510/200, 510/407

[56] References Cited

U.S. PATENT DOCUMENTS

| 4,013,475 | 3/1977 | Liebowitz et al. | 106/10 |
| 4,615,739 | 10/1986 | Clark et al. | 106/34 |
| 5,376,299 | 12/1994 | Russell et al. | 252/170 |

FOREIGN PATENT DOCUMENTS

| 8617 | 9/1905 | European Pat. Off. |
| 121367 | 5/1989 | Japan. |

*Primary Examiner*—Paul Lieberman
*Assistant Examiner*—Gregory R. Delcotto
*Attorney, Agent, or Firm*—John E. Reilly

[57] ABSTRACT

A solution for use in removing the double sided adhesive tape from mouldings used on motor vehicles and the like. The solution comprises (a) 60–97% by weight of kerosene, (b) 2–27% by weight of oil of turpentine, (c) 1–10% by weight of an oil based surface active agent selected from the group consisting of castor oil and linseed oil, and 0–3% weight of a perfume.

8 Claims, No Drawings

BODY MOULDING SOLUTION

CROSS-REFERENCE TO RELATED APPLICATIONS

This application is a continuation of applicants' copending U.S. patent application entitled "Body Moulding Solution", Ser. No. 08/327921, filed Oct. 24, 1994, now abandoned, which is a continuation-in-part of applicants' U.S. application Ser. No. 08/085881 entitled, "Body Moulding Solution", filed Jun. 30, 1993, now U.S. Pat. No. 5,396,299, both of which are incorporated herein by reference.

BACKGROUND OF THE INVENTION

The invention concerns the repair of motor vehicles, boats, caravans and like conveyances which have body mouldings. Body mouldings are strips of rubber, metallic or painted embellishments which are fitted to the exterior surfaces of the conveyance and which often have the added function of providing a degree of protection from damage which would otherwise occur from bumping or similar light contact against the exterior surface. Such body mouldings are generally fitted with a double sided adhesive tape. The adhesive used is of sufficient gripping power to prevent easy removal of the moulding from the conveyance, but which provides maximum adherence between the moulding and the tape itself, to thus enable the moulding to be peeled from the conveyance while the tape remains adhered to the moulding.

In the repair of conveyances such as motor vehicles, the body moulding is generally the first item to be removed from the damaged panel. The moulding is often suitable for re-use once the panel has been fixed and refitted, however, before the moulding can be reused, the double sided adhesive tape must be removed. This is usually a time consuming and expensive operation. There are basically four ways of doing this, viz by grinding, using a solvent, hot blowing or using a razor blade or a thumb.

Grinding with a grinding wheel can frequently damage the moulding or leave a bad surface on the moulding which means that the moulding cannot be properly re-fitted and is subject to falling off. Grinding is, furthermore, a messy and polluting operation and requires the use of a solvent to clean the area which has been ground. Solvents are not only a safety hazard due to fire and fumes, but can only be used on non-painted mouldings. Overall, grinding is a time consuming and expensive operation.

The use of solvents per se is often resorted to in order to prevent any damage to the moulds occurring. Large quantities have to be applied to be effective which results in wastage, as a good portion cannot be re-used, and they are a high fire risk. It is also a messy operation requiring a large work area, and operators get their hands covered in glue and solvent. Furthermore, as mentioned above, solvents are limited in their use to non-painted mouldings since they tend to damage paint.

Hot blowers are machines used to heat the adhesive strip to soften the adhesive and thereby permit the strip to be pulled from the moulding. Such blowers are expensive and frequently damage the moulding. Hot blowers are not in wide use.

Scraping with a razor blade or thumb has the disadvantage that the operator can end up with blisters or cut fingers. It is also a time consuming process and therefore expensive.

OBJECT OF THE INVENTION

It is therefore an object of the invention to provide a new manner of removing the double sided adhesive tape from motor vehicle and like mouldings, which obviates or at least minimises the aforementioned disadvantages.

SUMMARY OF THE INVENTION

According to the present invention, there is provided a solution for use in removing the double sided adhesive tape from mouldings and which has the further property of conditioning the moulding for re-use. The solution comprises an admixture of ingredients which synergistically function to give the desired properties and advantages. When the moulding is composed of polyurethane, the mixture comprises:

(a) 80–95% by weight of kerosene,
(b) 3–15% by weight of oil of turpentine,
(c) 1–10% by weight of a surface active agent selected rom castor oil and linseed oil, and
(d) 0–3% by weight of a perfume;

When the moulding is composed of modified polypropylene, the mixture comprises:

(a) 92–97% by weight of kerosene,
(b) 2–6% by weight of oil of turpentine,
(c) 1–2% by weight of a surface active agent selected from the group consisting of linseed oil and castor oil, and
(d) 0–1% by weight of a perfume.

When the moulding is composed of polycarbonate, the mixture comprises:

(a) 60–70% by weight of kerosene,
(b) 17–27% by weight of oil of turpentine,
(c) 3–10% by weight of a surface active agent selected from the group consisting of linseed oil and castor oil, and
(d) 0–3% by weight of perfume.

An all purpose mixture for use on a wide range of mouldings comprises:

(a) 80–90% by weight of kerosene,
(b) 5–15% by weight of a material selected from one or more of the group consisting of methyl ethyl ketone, ethyl butyl ketone, toluene, methyl isobutyl ketone, ethanol and petrolatum,
(c) 1–5% by weight of castor oil, and
(d) 0–1% by weight of a perfume.

Mouldings which can be treated with the immediately preceding mixture include modified polypropylene, soft and flexible polyurethane, polyamide, acrylonitrile-butadiene-styrene, polycarbonate, polyphenylene-oxide, polymer, and polybutylene-terephthalate-polymer mouldings.

In use, the body moulding with the double sided adhesive tape is immersed in a container of the solution and let stand for at least three hours. The body moulding is then removed from the solution and the double sided tape is peeled off by hand in one action. The moulding is then dried with a rag and a new double sided adhesive tape is applied prior to refixing the moulding to the vehicle.

The solution is reusable, wastage is negligible, the moulding is reconditioned, the moulding remains undamaged, there is a lower fire risk than with conventional solvents and minimal time is involved by the operator as he can be attending to other matters while the solution is working.

The oil of turpentine is preferably a mineral turpentine such as PETROPINE (Registered Trade Mark), a product manufactured by Mobil Australia Pty Ltd. This product has a specific gravity of 0.814@15° C., a refractive index of 1.461@20° C., a flash point of 31° C., an aniline point of 22, 48% vol. aromatics, 51.9% vol. saturates, 0.1% olefins, and distillation °C. IBP=145, 10%=153, 20%=158, 50%=162, 90% =180, FBP=+30).

The surface active agent is selected to reduce the interfacial tension between the refined petroleum product and the oil of turpentine, while promoting a sheen on the product to which it is applied. To this end, products such as vegetable oils having similar properties to linseed and castor oils, are preferred. The most preferred surfactant is castor oil itself. Castor oil is a non-drying oil having a specific gravity of 0.945–0.965@25° C., a saponification value of 178, iodine value 85, fp-10° C., a flash point of 229° C., and an autoignition temperature of 448° C.

Generally, there is a single perfume additive present in the composition. The preferred perfumes are GUMLEAF AROMATICS/PINEAPPLE FRAGRANCE (manufactured by Gumleaf Aromatics Australia Pty Ltd.), TEATREE OIL, EUCALYPTUS OIL and DEODALL no. 1 (manufactured by Givaudan-Roure Pty Limited, Australia). These products mask a wide range of odors and are particularly suitable for masking kerosene odors. Deodall no. 1 comprises a complex proprietary mixture of fragrance materials and has a specific gravity of 0.875@25° C., a refractive index of 1.473@20° C. and a flash point of 100° C.

Preferred embodiments of the invention are described in the following examples.

EXAMPLE 1

A solution was prepared by blending the following ingredients together in a container in the stated quantities Kerosene[1] about 93% by wgt Mineral Turpentine[2] about 5% by wgt Castor oil[3] about 2% by wgt Deodall no. 1[4] about 0.1% by wgt The solution was poured into a trough with a cover and a rubber moulding having a double sided adhesive tape, was totally immersed therein. After three hours, the moulding was removed from the trough and allowed to drain. It was found that the tape could easily be peeled from the moulding by hand. Inspection of the moulding revealed no damage whatsoever to the moulding but rather it was observed that the rubber had been rejuvenated. Furthermore, only a negligible amount of solution had been lost when the moulding was removed from the trough.

EXAMPLE 2

A solution was prepared by blending the following ingredients together in a container in the stated quantities Kerosene[1] about 94% by wgt Mineral Turpentine[2] about 5% by wgt Linseed oil[3] about 1% by wgt Gumleaf Aromatics—Pineapple Fragrance[4] about 0.1% by wgt

[1]Product of the Shell Company of Australia Pty Ltd
[2]Product of Mobil Australia Pty Ltd
[3]Product of Faulding Pharmaceuticals Pty Ltd Australia
[4]Product of Gumleaf Aromatics Australia Pty Ltd The same properties were noted as in Example 1.

EXAMPLE 3

This example demonstrates the range of solutions useful for removing double sided adhesive tape from SOFT POLYURETHANE mouldings.

Solutions were prepared by blending together kerosene, oil of turpentine, castor oil and the perfume Deodall no. 1 in a container in the proportions stated in Table 1:

TABLE 1

| Ingredient | Solution No. I (wgt %) | Solution No. II (wgt %) | Solution No. III (wgt %) | Solution No. IV (wgt %) |
|---|---|---|---|---|
| Kerosene[1] | about 50 | about 60 | about 80 | about 95% |
| Oil of Turpentine[2] | about 38 | about 27 | about 15 | about 3% |
| Castor oil[3] | about 12 | about 10 | about 4 | about 1% |
| Deodall no. 1[4] | about 0.1 | about 3 | about 1 | about 1% |

[1]Product of the Shell Company of Australia Pty Ltd
[2]Product of Mobil Australia Pty Ltd
[3]Product of Faulding Pharmaceuticals Pty Ltd Australia
[4]Product of Givaudan-Roure Pty Ltd, Australia A soft polyurethane body moulding having an adhesive tape adhered thereto was immersed in each of the above solutions and removed at hourly periods to determine whether the adhesive tape could be peeled therefrom. Any swelling in the body moulding was simultaneously noted.

It was found that the body moulding treated with solution no. I required 8 hours of soaking before the tape could be removed. This time frame is too long for repair workshop practice. Swelling also occurred.

The body moulding treated with solution no. II took 5 hours of soaking before the tape could be readily removed. This is also too long for workshop practice. Swelling also occurred.

The body moulding treated with solution no. III took 3 hours of soaking after which the tape could be removed. This is within appropriate workshop time frames.

No swelling of the body moulding occurred in any of the above testings.

Each example was repeated using linseed oil in place of castor oil and equivalent results were noted.

The conclusion is that solution no. III is the lower limit of compositions useful for removing adhesive tape from soft polyurethane mouldings. The upper limit of compositions is that given in Example IV where swelling of the moulding begins to appear.

EXAMPLE 4

This example demonstrates the range of solutions useful for removing double sided adhesive tape from MODIFIED POLYPROPYLENE mouldings.

Solutions were prepared by blending together kerosene, oil of turpentine, castor oil and the perfume Deodall no. 1 in a container in the proportions stated in Table 2:

TABLE 2

| Ingredient | Solution No. V (wgt %) | Solution No. VI (wgt %) | Solution No. VII (wgt %) |
|---|---|---|---|
| Kerosene[1] | about 85 | about 92 | about 97 |
| Oil of Turpentine[2] | about 10 | about 6 | about 2 |

TABLE 2-continued

| Ingredient | Solution No. V (wgt %) | Solution No. VI (wgt %) | Solution No. VII (wgt %) |
|---|---|---|---|
| Castor oil[3] | about 3 | about 1 | about 1 |
| Deodall no. 1[4] | about 2 | about 1 | about 0.1 |

[1]Product of the Shell Company of Australia Pty Ltd
[2]Product of Mobil Australia Pty Ltd
[3]Product of Faulding Pharmaceuticals Pty Ltd Australia
[4]Product of Givaudan-Roure Pty Ltd, Australia A modified polypropylene body moulding having a 3M® polyneoprene adhesive tape adhered thereto was immersed in each of the above solutions and removed at hourly periods to determine whether the adhesive tape could be peeled therefrom. Any swelling in the body moulding was simultaneously noted.

It was found that the body moulding treated with solution no. V took 6 hours of soaking before the tape could be removed. This time is too long for practical purposes. No swelling of the body moulding was noted.

The body moulding treated with solution no. VI took 3 hours of soaking before the tape could be readily removed. There is no deservable swelling of the moulding. This solution is therefore useful for workshop practice.

The body moulding treated with solution no. VII took 3 hours of soaking after which the tape could be readily removed. However there was a discernible, though negligible, amount of swelling. This composition would therefore represent the upper limit of useful solutions for removing adhesive tape from polypropylene body mouldings.

Each example was repeated using linseed oil in place of castor oil and equivalent results were noted.

EXAMPLE 5

This example illustrates the range of equivalents which can be substituted for oil of turpentine in the foregoing examples.

Solutions were prepared by blending the ingredients listed in Table 3 in the amounts indicated.

TABLE 3

| Solution VIII Ingredient wgt % | Solution IX Ingredient wgt % | Solution X Ingredient wgt % | Solution XI Ingredient wgt % | Solution XII Ingredient wgt % |
|---|---|---|---|---|
| Kerosene 85 MEK 10 | Kerosene 92 EBK 5 | Kerosene 80 MEK 14 toulene 5 | Kerosene 80 MEK 10 toulene 5 | Kerosene 80 MIK 15 |
| Castor Oil 5 | Castor Oil 3 | Castor Oil 1 | Castor Oil 5 | Castor Oil 5 |

| Solution XIII Ingredient wgt % | Solution Ingredient wgt % | Solution XV Ingredient wgt % | Solution Ingredient wgt % | XVI |
|---|---|---|---|---|
| Kerosene 88 MEK 5 MIK 5 | Kerosene 80 ETOH 10 toulene 5 | Kerosene 85 toulene 10 | Kerosene 80 MEK 13 petrolatum 5 | |

TABLE 3-continued

| Castor Oil 2 | Castor Oil 5 | Castor Oil 5 | Castor Oil 2 |
|---|---|---|---|

NOTE: MEK = methyl ethyl ketone
EBK = ethyl butyl ketone
MIK = methyl isobutyl ketone All solutions were tested against a range of body mouldings having double sided adhesive tape, by immersion as in the previous examples. The body mouldings tested are indicated in Table 4.

The adhesive tape was removed after 3 hours of immersion in each case.

TABLE 4

| Solution | Mouldings Treated |
|---|---|
| VIII | Polypropylene, polymethane, polyamide, acrylonitrile butadiene styrene |
| IX | Polyurethane - soft, acrylonitrile butadiene styrene |
| X | Polyurethane - soft |
| XI | Polyurethane - soft |
| XII | Polyurethane - soft |
| XIII | Polyurethane - flexible |
| XIV | Polypropylene, polymethane, polyamide, polyurethane, acrylonitrile |
| XV | Polyphenylene oxide polymer |
| XVI | polypropylene, polyurethane-soft |

EXAMPLE 6

Aluminum mouldings having an adhesive tape adhered thereto were immersed in the solutions listed in Table 5:

TABLE 5

| Ingredient | Solution No. XVII % wgt | Solution No. XVIII % wgt | Solution No. XIX % wgt | Solution No. XX % wgt |
|---|---|---|---|---|
| Kerosene[1] | 40 | 50 | 50 | 60 |
| Oil of Turpentine[2] | 52 | 38 | 42 | 32 |
| Castor oil[3] | 8 | 12 | 8 | 8 |

[1]Product of the Shell Company of Australia Pty Ltd
[2]Product of Mobil Australia Pty Ltd
[3]Product of Faulding Pharmaceuticals Pty Ltd, Australia Solutions XVII and XX took up to eight hours to remove the adhesive tape. The other two solutions took about three hours to remove the tape. This example illustrates that useful solutions have about a 50% wgt content of kerosene with a tolerable variability in the amount of oil by turpentine.

EXAMPLE 7

A polycarbonate moulding having an adhesive tape adhered thereto was immersed in the solutions listed in Table 6:

TABLE 6

| Ingredient | Solution No. XXI % wgt | Solution No. XXII % wgt | Solution No. XXIII % wgt | Solution No. XXIV % wgt |
|---|---|---|---|---|
| Kerosene[1] | 50 | 60 | 70 | 80 |
| Oil of Turpentine[2] | 43 | 27 | 17 | 13 |
| Castor oil[3] | 5 | 10 | 10 | 5 |
| Deodall no. 1[4] | 2 | 3 | 3 | 2 |

Solutions XXI and XXIV took six hours to remove the adhesive tape but turned the moulding brittle.

Solutions XXII and XXIII took three hours to remove the adhesive tape without damaging the moulding.

This example illustrates that useful solutions for polycarbonate mouldings have 60–70% wgt kerosene, 17–27% wgt oil of turpentine, 10 wgt % castor oil and 3% wgt % perfume.

We claim:

1. A solution for use in removing adhesive tape from motor vehicles mouldings consisting essentially of polyurethane, said solution consisting essentially of:
   (a) 80–95% by weight of kerosene
   (b) 3–15% by weight of oil of turpentine
   (c) 1–10% by weight of a surface active agent selected from the group consisting of linseed oil and castor oil, and
   (d) about 0.1% to about 3% by weight of a perfume.

2. A solution as defined by claim 1 which consists essentially of:
   (a) 80% by weight of kerosene,
   (b) 15% by weight of oil of turpentine,
   (c) 4% by weight of castor oil, and
   (d) 1% by weight of a perfume.

3. A solution as defined by claim 1 which consists essentially of:
   (a) 95% by weight of kerosene,
   (b) 3% by weight of oil of turpentine,
   (c) 1% by weight of castor oil, and
   (d) 1% by weight of a perfume.

4. A solution for removing adhesive tape from motor vehicle and like mouldings composed of modified polypropylene, said solution consists essentially of:
   (a) 92–97% by weight of kerosene,
   (b) 2–6% by weight of oil of turpentine,
   (c) 1% by weight of a surface active agent selected from the group consisting of linseed oil and castor oil, and
   (d) 0–1% by weight of a perfume.

5. A solution as defined in claim 4 which comprises:
   (a) 92% by weight of kerosene,
   (b) 6% by weight of oil of turpentine,
   (c) 1% by weight of castor oil, and
   (d) 1% by weight of a perfume.

6. A solution as defined in claim 4 which comprises:
   (a) 97% by weight of kerosene,
   (b) 2% by weight of oil of turpentine,
   (c) 1% by weight of castor oil, and
   (d) about 0.1% by weight of a perfume.

7. A solution for use in removing adhesive tape from motor vehicle and like mouldings comprised of polycarbonate, said solution consisting essentially of:
   (a) 60% by weight kerosene;
   (b) 27% by weight of turpentine;
   (c) 10% by weight of castor oil; and
   (d) 3% by weight of a perfume.

8. A solution as defined in claim 1 wherein said perfume has a specific gravity of 0.875 at 25° C., a refractive index of 1.473 at 20° C. and a flash point of 100° C.

* * * * *